United States Patent
Tanimoto et al.

(10) Patent No.: US 6,843,932 B1
(45) Date of Patent: Jan. 18, 2005

(54) INORGANIC ELECTROLYTIC COAGULANT AND A METHOD OF TRANSFORMING SLUDGE BY USING THIS INORGANIC ELECTROLYTIC COAGULANT

(75) Inventors: Kayohiko Tanimoto, 1-17-11, Inage Inage-Ku, Chiba-shi, Chiba 263-0034 (JP); Munehiko Kaga, 22-18, Turumai 4-chome, Sakado-shi, Saitama 350-0241 (JP); Masami Gibo, c/o Kabushiki Kaisha Gibo Kensetu Kogyo, 988, Anegasaki, Ichihara-shi, Chiba 299-0111 (JP)

(73) Assignees: Kayohiko Tanimoto, Chiba (JP); Munehiko Kaga, Sakado (JP); Masami Gibo, Ichihara (JP); Ichizo Kawano, Ageo (JP)

( * ) Notice: Subject to any disclaimer, the term of this patent is extended or adjusted under 35 U.S.C. 154(b) by 0 days.

(21) Appl. No.: 10/297,030

(22) PCT Filed: May 31, 2000

(86) PCT No.: PCT/JP00/03515
§ 371 (c)(1),
(2), (4) Date: Nov. 21, 2003

(87) PCT Pub. No.: WO01/91878
PCT Pub. Date: Dec. 6, 2001

(51) Int. Cl.$^7$ .................................................. C02F 1/52
(52) U.S. Cl. ........................ 252/181; 210/716; 210/728
(58) Field of Search .................................. 210/699, 700, 210/702, 716, 723, 728; 252/175, 180, 181; 516/137, 138

(56) References Cited

U.S. PATENT DOCUMENTS

| | | | | |
|---|---|---|---|---|
| 4,566,986 A | * | 1/1986 | Waldmann | 252/175 |
| 5,229,261 A | * | 7/1993 | Ogawa et al. | 430/558 |
| 5,346,643 A | * | 9/1994 | Kuno | 252/175 |
| 5,411,569 A | * | 5/1995 | Hjersted | 71/24 |
| 5,785,862 A | * | 7/1998 | Graham et al. | 210/723 |
| 6,306,308 B1 | * | 10/2001 | Hassick et al. | 210/716 |
| 6,375,919 B1 | * | 4/2002 | Kakio et al. | 423/558 |

FOREIGN PATENT DOCUMENTS

JP 410272304 A * 10/1998

* cited by examiner

Primary Examiner—Peter A. Hruskoci
(74) Attorney, Agent, or Firm—Flynn, Thiel, Boutell & Tanis, P.C.

(57) ABSTRACT

Contaminated sediments in such bodies of water as lakes and ponds, inner bays and rivers obtained by dredging are converted into favorable soils by adding to the contaminated sediments and aqueous solution formed by mixing an inorganic electrolytic coagulant obtained by mixing phosphonic acid and magnesium sulfate in a solvent not containing chlorine, stirring them for several minutes and then mixing aluminum sulfate and polyferric sulfate and stirring them for several minutes, together with a soil particle reinforcing agent and a pH controller.

2 Claims, No Drawings

US 6,843,932 B1

INORGANIC ELECTROLYTIC COAGULANT AND A METHOD OF TRANSFORMING SLUDGE BY USING THIS INORGANIC ELECTROLYTIC COAGULANT

DESCRIPTION

Inorganic electrolytic coagulant and a method of transforming sludge by using this inorganic electrolytic coagulant

TECHNICAL FIELD

This invention relates to inorganic electrolytic coagulants capable of converting contaminated sediment at the bottom of lakes and ponds, bays and rivers into soils excellent in hydrophobicity, water retainability and air permeability, as well as the method of modifying sludge using the inorganic electrolytic coagulants.

BACKGROUND ART

Phosphorus, nitrogen, organic materials, eutrophic salts such as are found in sludge and undecomposed material are deposited in the sediments at the bottom of lakes and bonds, inner bays and rivers, and DO in the sediment is lowered due to increase in oxygen consumption.

In this stage, aqueous eco-systems are disrupted and natural self purification capacity is lost, and the sludge sediments are converted into sulfides. Various kinds of plankton and water blooms are generated using these sulfides as the energy source and the water quality is worsened in an accelerated manner.

Dead bodies of various insects, fishes, algae, aquatic plants, as well as influent soils from fertile areas which are deposited become what is referred to as humus sludge which as the name implies contains a great amount of fermented organic materials containing all sorts of eutrophic salts in high concentration, which are highly effective in promoting growth of vegetation. However, since such deposits elute eutrophic salts such as of phosphorus and nitrogen into water as the result of anaerobic decomposition to cause the plant cycle phenomenon in the natural world and, as a result, remarkably lower the DO, promote putrefactive decomposition and form sulfides under these reductive conditions, which are deposited, for example, at the bottom of lakes and ponds.

Accordingly, the deposits generate malodors such as of methane, butane and hydrogen sulfide, and iron components are converted into iron sulfide to exhibit black brown or dense brown colors. Further, many ingredients change their forms and are dissolved to promote environmental destruction.

Accordingly, transformation of the bottom sludge under reductive conditions is the key to the improvement of water quality and the eco-systems in recovered by the modification for the sediments.

However, the current method of purifying the sediments merely relies on the removal of the sediments by dredging, and more dredging destroys the aqueous eco-systems afterwards appearing as if it were the inside of a roof top water tank with no circulating eco-system.

Once after the eco-systems are destroyed by the removal of sediments by dredging as described above, regeneration of lakes and bonds requires a long time, up to several decades.

For overcoming the foregoing problem, this invention not only is intended to shorten the operation time for the cleaning treatment of sludges and save construction cost but also to recover the resources of the dredged sludge as one positive means for environmental conservation and continuous utilization of resources. Particularly, this invention intends to obtain soils capable of increased production of healthy foods by organic cultivation without using agricultural chemicals which greatly contaminate the environment, destroy natural eco-systems and indiscriminately kill those eco-systems' inhabitant organisms.

DISCLOSURE OF THE INVENTION

For attaining the foregoing object, this invention provides an inorganic electrolytic coagulant obtained by mixing phosphonic acid and magnesium sulfate into a solvent not containing chlorine, stirring the mixture for several minutes, then mixing aluminum sulfate and polyferric sulfate and stirring them for several minutes.

Further, this invention provides a method of transforming sludge by adding, during discharge of sediments by dredging, an aqueous solution formed by mixing an inorganic electrolytic coagulant, sodium silicate serving as a soil particle reinforcing agent and calcium carbonate serving as a pH controller to the sediments during discharge thereof.

Furthermore, this invention provides a method of modifying sludges by leaving sediments obtained by dredging for several hours in a natural precipitation settling tank, cleaning and discharging supernatant water, and then adding the inorganic electrolytic coagulant, the soil particle reinforcing agent and pH controller as described above into the remaining sediments.

BEST MODE FOR CARRYING OUT THE INVENTION

The organic electrolytic coagulant and the method of modifying the sludge by using the inorganic electrolytic coagulant according to this invention will here be described in preferred embodiments.

The inorganic electrolytic coagulant of the invention is prepared by using clean water not containing chlorine such as ground water as a solvent, charging 5–10 g of phosphonic acid and 15–30 g of magnesium sulfate into 50–100 g of the solvent, lightly stirring them for 2–3 minutes, then charging 350–700 g of aluminum sulfate and polyferric sulfate and lightly stirring them for about 5–10 minutes.

The constituent formulation of the inorganic electrolytic coagulant is as shown in the following Table 1.

TABLE 1

| | Name of chemicals | Chemical formula | Blending weight (g) | Remarks |
|---|---|---|---|---|
| 1 | Solvent (clean water) | $H_2O$ | 50–100 | Ground water not intruded with chlorine |
| 2 | Aluminum sulfate | $Al_2(SO_4)_3 \cdot H_2O$ | 350–700 | Inorganic coagulant |
| 3 | Polyferric sulfate | $[Fe_2(OH)h(SO_4)_3n/_2]n$ | 15–30 | Inorganic coagulant |
| 4 | Magnesium sulfate | $MgSO_4 \cdot 7 H_2O$ | 15–30 | Solidifying agent |
| 5 | Phosphonic acid | $C_2H_8O_7P_2$ | 5–10 | As chelating agent |

EXAMPLE 1

The inorganic electrolytic coagulant is applied to the sediments in the discharge stream of the sediments resulting from dredging of lakes and ponds, inner bays, rivers, etc. Simultaneously, an aqueous solution formed by mixing sodium silicate serving as the soil particle reinforcing agent and calcium carbonate serving as the pH controller may be applied to modify the sludge.

Since the polluted water generated by this process gradually becomes purified, it can be discharged.

EXAMPLE 2

The dredged sediments described above are stocked in a natural precipitation tank. After standing still in the natural precipitation tank for about 2–3 hours, supernatant water is clarified and discharged. Then, the inorganic electrolytic coagulant described above is applied into the sediments and, further, an aqueous solution formed by mixing sodium silicate serving as the soil particle reinforcing agent and calcium carbonate serving as the pH controller is applied to transform the sludge.

Table 2 shows the amounts of the inorganic electrolytic coagulant, the soil particle reinforcing agent and the pH controller added per one ton of the sediments.

TABLE 2

| | Name of chemicals used in combination | Chemical formula | Addition amount | Remarks |
|---|---|---|---|---|
| 1 | Inorganic electrolytic coagulant | — | 5–10 liter | Main agent for destruction of hydrophilic groups in sludge solidification of aggregate particles: |
| 2 | Sodium silicate | $Na_2O \cdot nSiO_2 \cdot nH_2O$ | 5–10 liter | Reinforcing soil particles with water soluble aggregate particle surface film |
| 3 | Calcium Carbonate | $CaCO_3$ | 5–10 liter | 1 kg of calcium carbonate dissolved in 20–30 liter of clean water is discharged to dredged sediments till pH is controlled to 6.5–7. |

Examples 1 and 2 described above are characterized by the use of sodium silicate and calcium carbonate as the agents used in combination with the inorganic electrolytic coagulant.

The amount of the agents added are different depending on the property of the sediments and the application use of the treated soils.

The soil particle reinforcing agent and the pH controller is combined with an inorganic electrolytic coagulant of a different ionic valence in one solvent by using a special device and modified into a highly positively charged state obtained due to a synergistic effect thereof through a reaction which can not take place by single positively discharged state. The soil improver causes ion increasing phenomenon characteristic to inorganic systems during hydrating reactions in which several types of positively charged materials trigger reactions simultaneously in the sediments. Each type of material makes respective contributions according to their characteristics, causing strong bonding by collision of charges of opposite polarity to destroy the outermost of the electric double layer of the pollutant particles and the sediments.

That is, neutralization causes electrolytic bonding according to the van der Waals' law and they are grown into aggregate particles. Since the grown aggregate particles lose hydrophilic groups, bound molecules of water change into free water molecules and are driven out from particles by the electrolytic compressive force of particle bonding (referred to as hydrophobic phenomenon), and the particles are firmly bound over time into hydrophobic aggregates (referred to as irreversibility).

That is, the treated soil does not turn into sludge again, and includes various kinds of nutrient salts in its constructed active aggregate particles. The particles are prevented from dissolving by silica layers and hydroxy apatite.

In the soil particles improved as described above, alumina octahedron and silicic acid tetrahedron are bonded, the SiO charge keeps a balance with the negative charge of one $O_2$ and the negative charge of another $O_2$ attracts adjacent SiO.

On the other hand, $Al_2O_3$ octahedron adsorbs and retains manganese, magnesium, etc. That is, various kinds of minerals and nutrient salts are firmly retained by hydroxy apatite and silicic acid colloid in the aggregate particles which contain a great amount of oxygen. At the same time, since organic materials contained in the sediments have many —OH and —COO-(phenolic group, carboxyl group) providing excellent CEC and AEC (ion exchange capacity), they constitute a rich store of nutrient energy.

Further, SiO enhances immunity of plants or soil microorganisms to promote healthy growth.

In view of the characteristic features described above, it is possible to supply nutrient ingredients necessary for plants at the necessary time and in the necessary amount.

As has been described above, the treated soils obtained by the inorganic electrolytic coagulant and the method of modifying the sludge by using the inorganic electrolytic coagulant according to this invention:

1) have 1.5–3.0 kg of ground bearing capacity (can bear its own weight) and can provide soils which are softened when cultivated and hardened when roll pressed, 2) can provide soil with water retainability, air permeability and hydrophobic property for drainability which are extremely important for vegetation.

3) can eliminate various problem characteristics of sludge and produce soils having properties the same as those of usual healthy soils, retaining nutrient salts essential to vegetation and effective to plant growth, and 4) can produce soils in a pH range of 6–7, having a chelating effect and capable of making environmentally harmful substances non-deleterious.

The inorganic electrolytic coagulant and the solid obtained by the sludge transforming method using the inorganic electrolytic coagulant can be utilized effectively in various fields such as utilization as agricultural lands, utilization as fertile sources for organic cultivation promoting the increased production of agricultural plants without using agricultural chemicals, utilization as a resource for recovering the fertility of degraded agricultural land which has been degraded in the ion exchange capacity by customary agricultural methods, as well as utilization as developing soils for forests, parks or land reclamation.

What is claimed is:

1. An inorganic electrolytic coagulant comprising a reaction product formed by the steps of mixing 5–10 g of phosphonic acid chelating agent and 15–30 g of magnesium sulfate in 50–100 g of chlorine-free solvent to form a reaction mixture, and then mixing 350–700 g of aluminum sulfate and 15–30 g of polyferric sulfate with the reaction mixture, to form said reaction product.

2. The inorganic electrolytic coagulant of claim 1, wherein the chlorine-free solvent is water.

* * * * *